US007454407B2

(12) United States Patent
Chaudhuri et al.

(10) Patent No.: US 7,454,407 B2
(45) Date of Patent: Nov. 18, 2008

(54) TECHNIQUES FOR ESTIMATING PROGRESS OF DATABASE QUERIES

(75) Inventors: Surajit Chaudhuri, Redmond, WA (US); Ravishankar Ramamurthy, Redmond, WA (US); Kaushik Shriraghav, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 284 days.

(21) Appl. No.: 11/149,968

(22) Filed: Jun. 10, 2005

(65) Prior Publication Data

US 2006/0282404 A1 Dec. 14, 2006

(51) Int. Cl.
G06F 7/00 (2006.01)
(52) U.S. Cl. .................. 707/2; 707/3; 707/4; 707/5
(58) Field of Classification Search ............ 707/2, 707/3, 4, 5
See application file for complete search history.

(56) References Cited

U.S. PATENT DOCUMENTS

| 2005/0222965 | A1* | 10/2005 | Chaudhuri et al. | 707/1 |
| 2006/0190430 | A1* | 8/2006 | Luo et al. | 707/3 |
| 2006/0218125 | A1* | 9/2006 | Kandil et al. | 707/2 |

OTHER PUBLICATIONS

Chaudhuri et al., "Estimating Progess of Execution for SQL Queries", SIGMOD 2004, Jun. 13-18, pp. 1-12. (Provided by Applicant).*
Markl et al., "Robust Query Processing through Progressive Optimization", SIGMOD 2004, Jun. 13-18, pp. 1-12. (Provided by Applicant).*
Chaudhuri et al; "On Random Sampling over Joins"; ACM SIGMOD '99 Philadelphia PA; pp. 263-274.
Ioannidis; "Query Optimization"; ACM Computing Surveys, vol. 28, No. 1, Mar. 1996; pp. 121-123.
Bruno et al; "Exploiting St6atistics on Query Expressions for Optimization"; ACM SIGMOD 'Jun. 4-6, 2002, Madison, Wisconsin; pp. 263-274.
Haas et al; "Selectivity and Cost Estimation for Joins BAsed on Random Sampling"; Journal of Computer and Systems Sciences, vol. 52, No. 3; Jun. 1996, pp. 550-569.
Kabra et al; "Efficient Mid-Query Re-Optimization of Sub-Optimal Query Execution Plans"; 1998 ACM SIGMOD Seattle WA; pp. 106-117.
Haas et al.; "Ripple Joins for Online Aggregation"; SIGMOD '99 Philadelphia PA; pp. 287-298.
Hellerstein et al; "Online Aggregation"; 1997 ACM SIGMOD AZ; pp. 171-182.
Ioannidis et al.; "On the Propagation of Errors in the Size of Join Results"; 1991 SIGMOD ACM; pp. 268-277.

(Continued)

*Primary Examiner*—Charles Rones
*Assistant Examiner*—Phuong-Thao Cao
(74) *Attorney, Agent, or Firm*—Lee & Hayes, PLLC

(57) ABSTRACT

Techniques for estimating the progress of database queries are described herein. In a first implementation, a respective lower-bound parameter is associated with each node in an operator tree that representing a given database query, and the progress of the database query at a given point is estimated based upon the lower-bound parameters. In a second implementation, the progress of the query is estimated by associating respective lower-bound and upper-bound parameters with each node in the operator tree. The progress of the query at the given point is then estimated based on the lower-bound and upper-bound parameters.

14 Claims, 6 Drawing Sheets

OTHER PUBLICATIONS

Luo et al.; "Toward a Progress Indicator for DAtabase Queries"; ACM SIGMOD 2004, Jun. 13-18, 2004, Paris France; 12 pages.
Ioannidis et al.; "Balancing Histogram Optimality and Practicality for Query Result Size Estimation"; ACM SIGMOD '95 San Jose, CA; pp. 233-244.
Haas; "Large-Sample and Deterministic Confidence Intervals for Online Aggregation"; 9th International Conference on Scientific and Statistical Database Management, 1997; pp. 51-62.
Acharya et al.; "Join Synopses for Approximate Query Answering"; ACM SIGMOD '99 Philadelphia PA; pp. 275-286.
Chaudhuri; "An Overview of Query Optimization in Relational Systems"; 10 pages, no date.
Luo et al.; "Increasing the Accuracy and Coverage of SQL Progress Indicators"; 12 pages, no date.
When Can We Trust Progress Estimators for SQL Queries?; Paper ID: 448; 12 pages, no date.

* cited by examiner

TECHNIQUES FOR ESTIMATING PROGRESS OF DATABASE QUERIES

BACKGROUND

Estimating the progress of linear operations such as file downloads is generally straightforward. Given a file of a known size, if it takes T units of time to download half of the file, then it will most likely take about 2T units of time to download the entire file.

In contrast, estimating the progress of database queries is generally not as straightforward. A given database query may involve a plurality of sub-operations, such as, for example, loading a given table, sorting entries within the table, selecting certain elements of the table that satisfy query constraints, and outputting the results of the foregoing operations. This overall process and the constituent sub-operations may not always be linear, so estimating the progress of a given database query may not be as straightforward as in the file-download example given above.

More particularly, the amount of work involved in servicing a given database query may not be distributed evenly among the various sub-operations of the database query. Also, the workload may be skewed unpredictably toward one or more of the sub-operations. Thus, estimating the progress of the query based on the status or history of one of the sub-operations may be inaccurate if that sub-operation accounts for relatively little of the workload associated with servicing the overall query. Accordingly, a need exists in the art for improved techniques for estimating the progress of database queries.

SUMMARY

Techniques for estimating the progress of database queries are described herein. A first implementation for progress estimation includes associating a respective lower-bound parameter with each node in an operator tree that representing a given database query, and estimating progress of the database query at a given point based upon the lower-bound parameters. More particularly, the first implementation includes determining how much work the query has done up to the given point, estimating how much work the entire query will entail, and dividing a parameter representing the work done so far by a parameter representing the estimated work load to perform the progress estimation. The estimated work load is approximated by the lower-bound parameter established for each node.

A second implementation for progress estimation includes associating respective lower-bound and upper-bound parameters with each node in the operator tree, and estimating progress of the database query at the given point in the database query based on the lower-bound and upper-bound parameters. Like the first implementation, the second implementation includes determining how much work the query has done up to the given point. However, in estimating how much work the entire query will entail, the second implementation sums the lower-bound parameters and the upper-bound parameters for each node and computes an average thereof. Thus, the estimation performed by the second implementation uses not only the lower-bound parameter, but also the upper-bound parameter. The progress estimate is computed by dividing the work done so far in the query by the sums of the above averages for each node in the operator tree.

This Summary is provided to introduce a selection of concepts in a simplified form that are further described below in the Detailed Description. This Summary is not intended to identify key features to essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
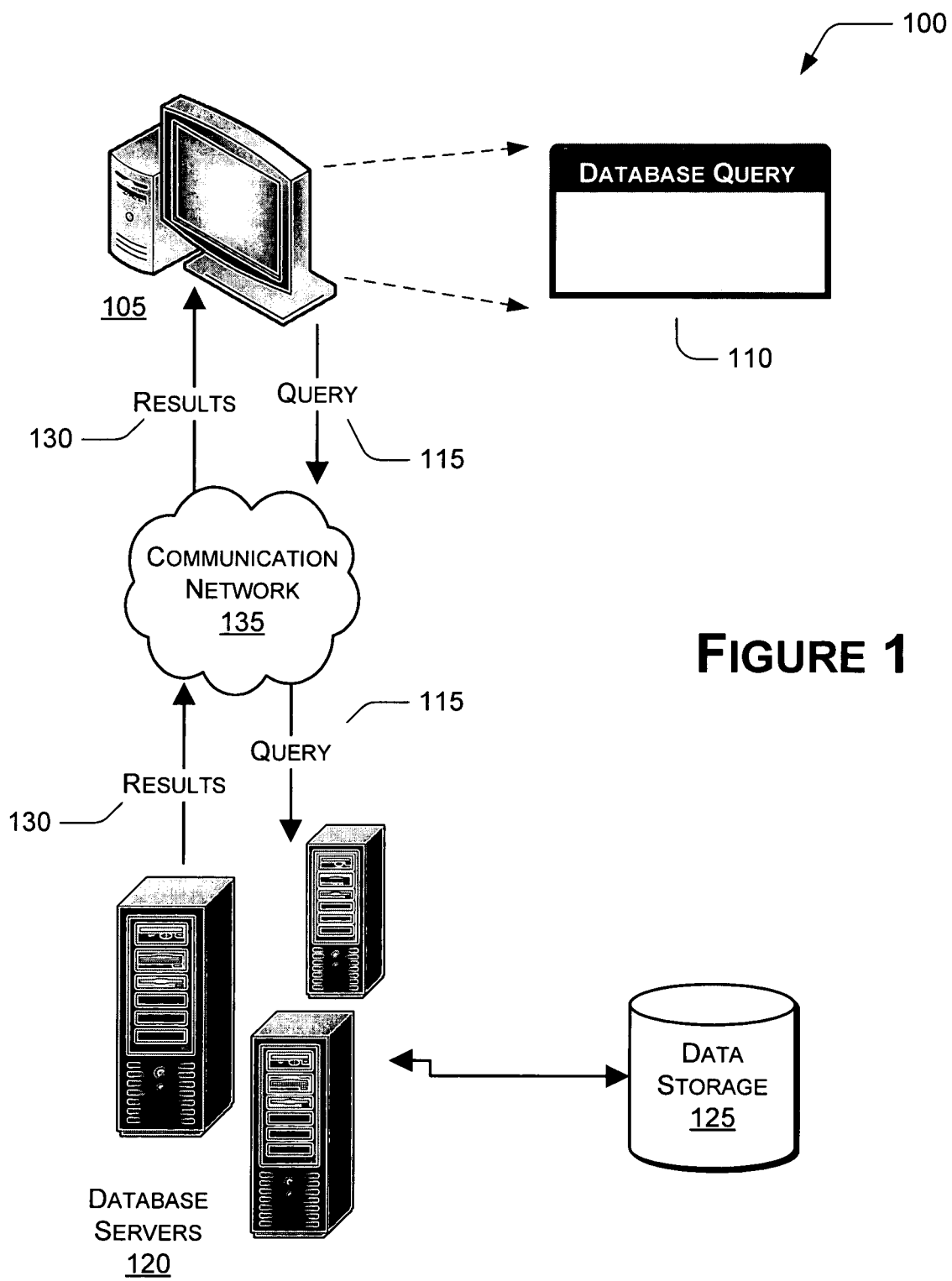
FIG. 1 is an architectural diagram illustrating components and data flows related to performing database queries.

FIG. 1 illustrates components and data flows 100 related to performing database queries. An operator or user (not shown) using workstation 105 can enter a set of statements defining a given query via a window or other user interface element 110. The query, represented generally by lines 115, may be defined using any known database query language, including but not limited to the Structured Query Language (SQL). In general, the database query language is any high-level language enabling human users to formulate abstract requests for data into query statements that a computer-based system can process.

Once the query 115 is defined, it is transmitted to one or more database servers 120. While FIG. 1 shows three database servers 120 for convenience, this illustration is non-limiting, and the teachings herein can be practiced with any number of database servers 120. Once the database servers 120 receive the query 115, they execute it against data contained in data storage 125, which may contain the bulk data against which any number of queries 115 may be run. While data storage 125 is shown apart from the database servers 120 in FIG. 1, this illustration is for convenience only, and the data storage 125 can be implemented apart from or integrated into the database servers 120. After executing the query 115, the database servers 120 return any results 130 of the query 115 to the workstation 105 from which the query 115 originated, where the operator or user can review the results 130.

A communication network 135 connects the workstation 105 and the database servers 120, and can take any form appropriate in the context of a particular implementation of the teachings herein. More particularly, the communication network 135 can take the form of a local area network (LAN), wide area network (WAN), or any other form of communications network. The particulars of the implementation of the communication network 135 are in no way critical to the teachings herein, and therefore are not discussed further herein. Moreover, in some implementations of the teachings herein, the workstation 105 may be local to the database servers 120, in which case the communication network 135 may be omitted altogether.

Figure 2:
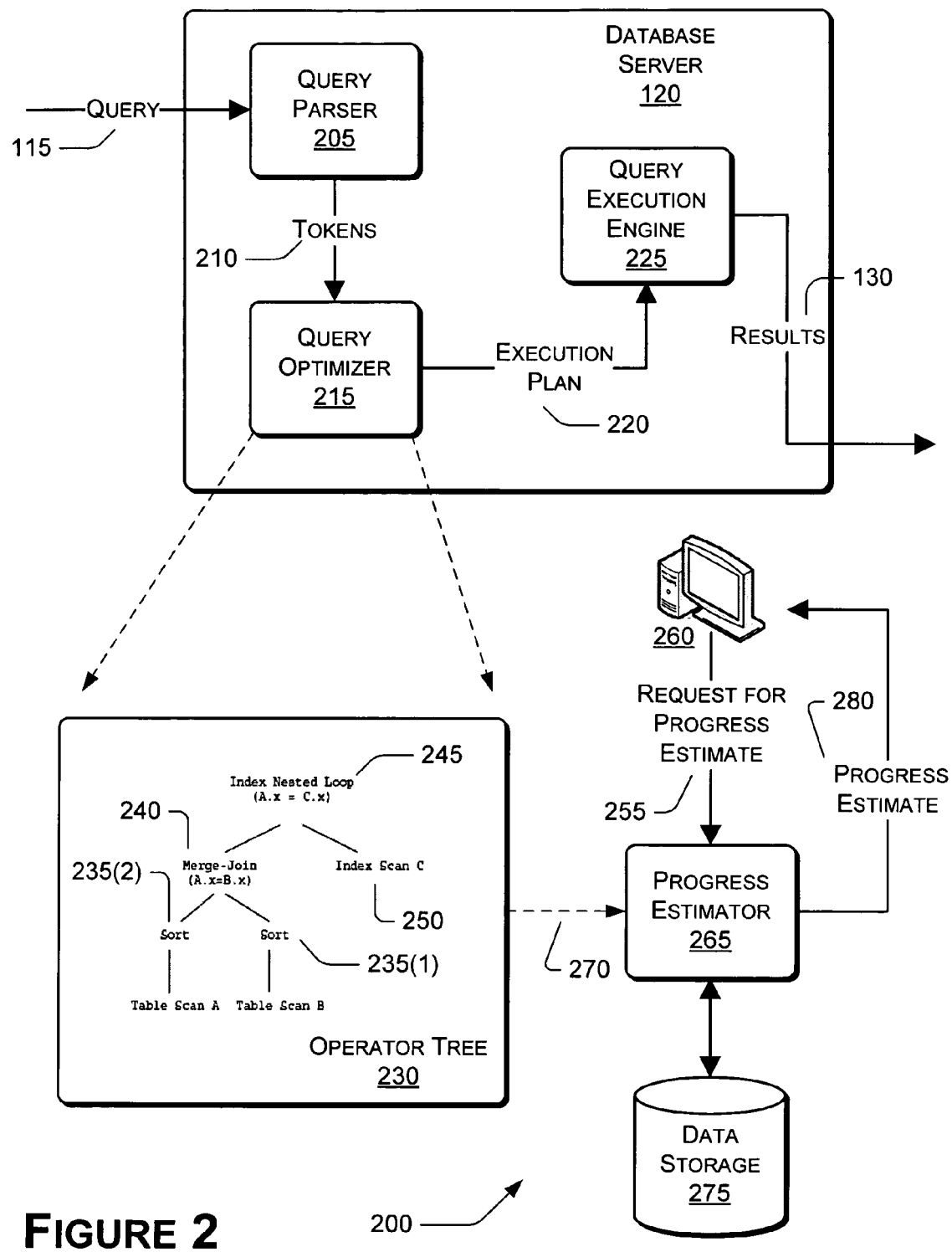
FIG. 2 is an architectural diagram illustrating further components and data flows relating to the database servers shown in FIG. 1.

FIG. 2 illustrates further components and data flows 200 relating to a given one of the database servers 120 shown in FIG. 1. The query 115 can be assigned to and received as input by the given database server 120. As noted above in connection with FIG. 1, the query 115 may be in the form of a set of statements formulated in accordance with any number of known database query languages, including but not limited to SQL. The input query 115 can be received by a query parser 205, which can be implemented as a hardware and/or software element within the database server 120. The query parser 205 analyzes the input query 115 according to the syntactical rules of the language in which the query 115 was formulated. If the syntax of the query 115 is valid, then the query parser 205 breaks the query 115 into a set of tokens 210, and forwards them to a query optimizer 215.

The query optimizer 215 receives the query 115 as input, identifies a number of alternative strategies for completing the query 115, evaluates each alternative strategy against a set of criteria, and then selects one of the alternative strategies to execute the query 115. The selected strategy is represented by an execution plan 220, which is forwarded to the query execution engine 225 for execution.

The query execution engine 225 can be implemented as a hardware and/or software element within the database server 120, and functions to execute the query 115, in the form of the execution plan 220, against the data store 125. For legibility and conciseness, the data store 125 is not shown in FIG. 2, but was shown and discussed in connection with FIG. 1. The query execution engine 225 outputs query results 130, which can be routed as shown in FIG. 1.

Returning to the query optimizer 215, as part of its processing, it can generate an operator tree 230 that provides an abstract representation of the execution of the query 115. The operator tree 230 is a tree-based data structure, with each node in the operator tree 230 representing a given operator included in the execution plan 220 and with the leaves of the tree representing the data that flows upwards in the operator tree 230. In the illustrative and non-limiting operator tree 230 shown in FIG. 2, data is generated by scanning two tables A and B, and this data passes up to respective sort operators 235(1) and 235(2). The two streams of sorted data are then merged by a merge-join operator 240, and passed to an index-nested-loop operator 245. The latter operator 245 processes the data received from the merge-join operator 240 along with data read by an index-scan operation 250. The outputs of the index-nested-loop operator 245 are essentially the results 130 of the query 115.

During the execution of the query 115 by the query execution engine 225, a user or other operator (not shown) can submit a request 255 for a progress estimate. This request 255 may be submitted using a workstation 260, which may or may not be the same workstation 105, shown in FIG. 1, from which the original query 115 was submitted. The request 255 is sent to a progress estimator 265, which can be implemented as a hardware and/or software element. While FIG. 2 shows the progress estimator 265 separate from the database server 120, this configuration is for convenience in illustration only. In implementations, the progress estimator 265 can be integrated into the database server 120, or may operate apart from the database server 120 and communicate therewith as appropriate. The progress estimator 265 uses at least the operator tree 230 as input, as represented by the line 270, and the functional details of the progress estimator 265 are described in further detail below in connection with FIGS. 4 and 5. The progress estimator 265 generates a progress estimate 280 and sends it to the workstation 260 from which the request 255 originated.

FIG. 2 illustrates a data store 275 accessible to the progress estimator 265 to store any data read or written by the progress estimator 265. For example, any parameters discussed below that are defined by the progress estimator 265 may be stored in the data store 275, either temporarily or more permanently. It is also noted that the data store 275 could be integrated with the data store 125 shown in FIG. 1, and also could be integrated with the progress estimator 265.

Figure 3:
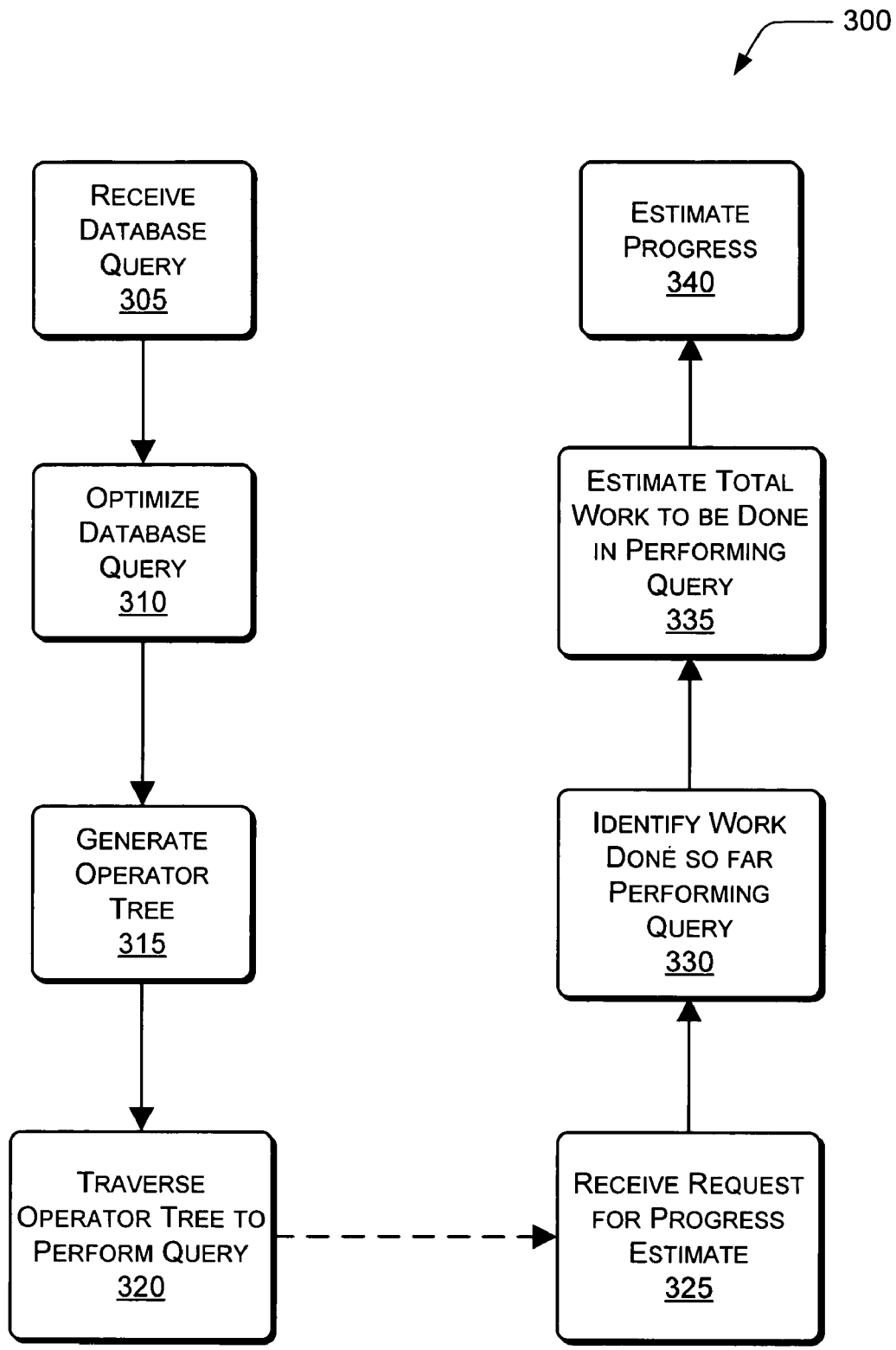
FIG. 3 is a flowchart illustrating an overall process flow performed in servicing a database query.

FIG. 3 illustrates a process 300 for servicing a database query. In block 305, the process 300 receives a request to run a given query 115 against a given data store 125. The particulars of the request and the given data store 125 are not discussed in detail here since the teachings herein are applicable to a wide variety of different database environments. The process 100 may be executed in connection with the database servers 120 and/or the progress estimator 265 shown in FIGS. 1 and 2.

In block 310, the process 100 can optimize the input query 115 for efficient execution, if appropriate in a given application, using the query optimizer 215 shown in FIG. 2. In some implementations, the query 115 may not be optimized before execution. In this sense, block 310 can be considered optional.

As part of the processing shown in block 310, the query optimizer 215 may generate and use various statistics to select the strategy for performing the query 115. Further, these statistics may be made available outside the scope of the query optimizer 215. Known techniques for estimating progress of database queries 115 may use these statistics. However, these statistics were generated in the context of optimizing the query 115, and may not be entirely appropriate as a basis for estimating the progress of the query 115. Thus, in some cases, progress estimations based on these statistics that result from the query optimization may exhibit unacceptably high errors.

In block 315, the process 300 generates the operator tree 230. In implementations where the query is not optimized, the operator tree 230 may be generated by another component of the database servers, such as the query execution engine 225. In block 320, the process 300 begins executing the query 115, and in so doing, begins to traverse the operator tree 230. If the query 115 is permitted to complete, the process 300 traverses the entire operator tree 230 and eventually provides the results 130 of the query 115 to whoever requested the query 115.

At some point in the process shown in block 320, the process 300 may receive a request 255 for an estimate of the progress of the query 115, as shown by block 325. The dashed line connecting blocks 320 and 325 in FIG. 3 indicates that the processing represented by blocks 325-340 may be viewed as a sub-process, relative to the processing represented by blocks 305-320. The processing shown in blocks 325-340 may proceed in parallel with the processing shown in block 320. For example, a user or other operator may initiate the query 115, wait some period of time, and then wish to determine how close the query 115 is to finishing. Depending on the progress of the query 115, as indicated by the progress estimator 265 using the teachings herein, the user may decide to let the query 115 run its course, may decide to terminate the query 115, or may take any other action as appropriate.

When the request 255 for the progress estimate is received, the process 300 in block 330 identifies how much "work" has been done so far in servicing the query 115. One non-limiting example of "work" as used in this context is the number of calls to a given function that have occurred thus far in servicing the query 115. One example of a suitable function is Getnext, which is a function that returns the next child of a given node in, for example, the operator tree 230. Getnext is used herein only as an example to facilitate discussion, but not as a limitation of the teachings herein. By counting the number of calls to a function such as getnext, block 130 can determine how much work has been performed thus far to service the query 115 up to the time that the request 255 for the progress estimate is received in block 305. As discussed in further detail below, a parameter representing the work done so far can serve as the numerator in a division operation used to estimate the progress, with the denominator to be discussed next. Other approaches to determining how much work done so far can include, but are not limited to, determining the number of bytes returned by each operator processed so far, the number of disk input/outout (I/O) operations (whether sequential or random), and the number of CPU operations.

In block 335, the process 300 estimates how much work is involved with servicing the entire query 115, should the query 115 be permitted to run its full course. Various non-limiting approaches for estimating how much work the entire query 115 is expected to entail are discussed in more detail below in connection with FIGS. 4 and 5. In overview, the implementation shown in FIG. 3 defines a lower bound (LB) on the amount of work expected for each node in the operator tree 230, and assumes that the work actually performed when processing each node of the operator tree 230 will be that lower bound. The implementation shown in FIG. 5 defines for each node in the operator tree both a lower bound and an upper bound on the amount of work expected for that node. The FIG. 5 implementation also assumes that the work actually performed when processing each node of the operator tree 230 will be somewhere between the lower bound and the upper bound, typically an average of the lower bound and the upper bound.

Having estimated how much work the entire query 115 is expected to entail (block 335), and having estimated how much work the query 115 has performed (block 330) up to the point when the request 255 for a progress estimate was received (block 325), the process 300 can estimate the progress of the query 115, as represented generally by block 340. In general, the process 300 estimates the progress of the query 115 by dividing the amount of work done so far in servicing the query (identified in block 330) by the total amount of work to be done in servicing the entire query 115 (estimated in block 335).

Figure 4:
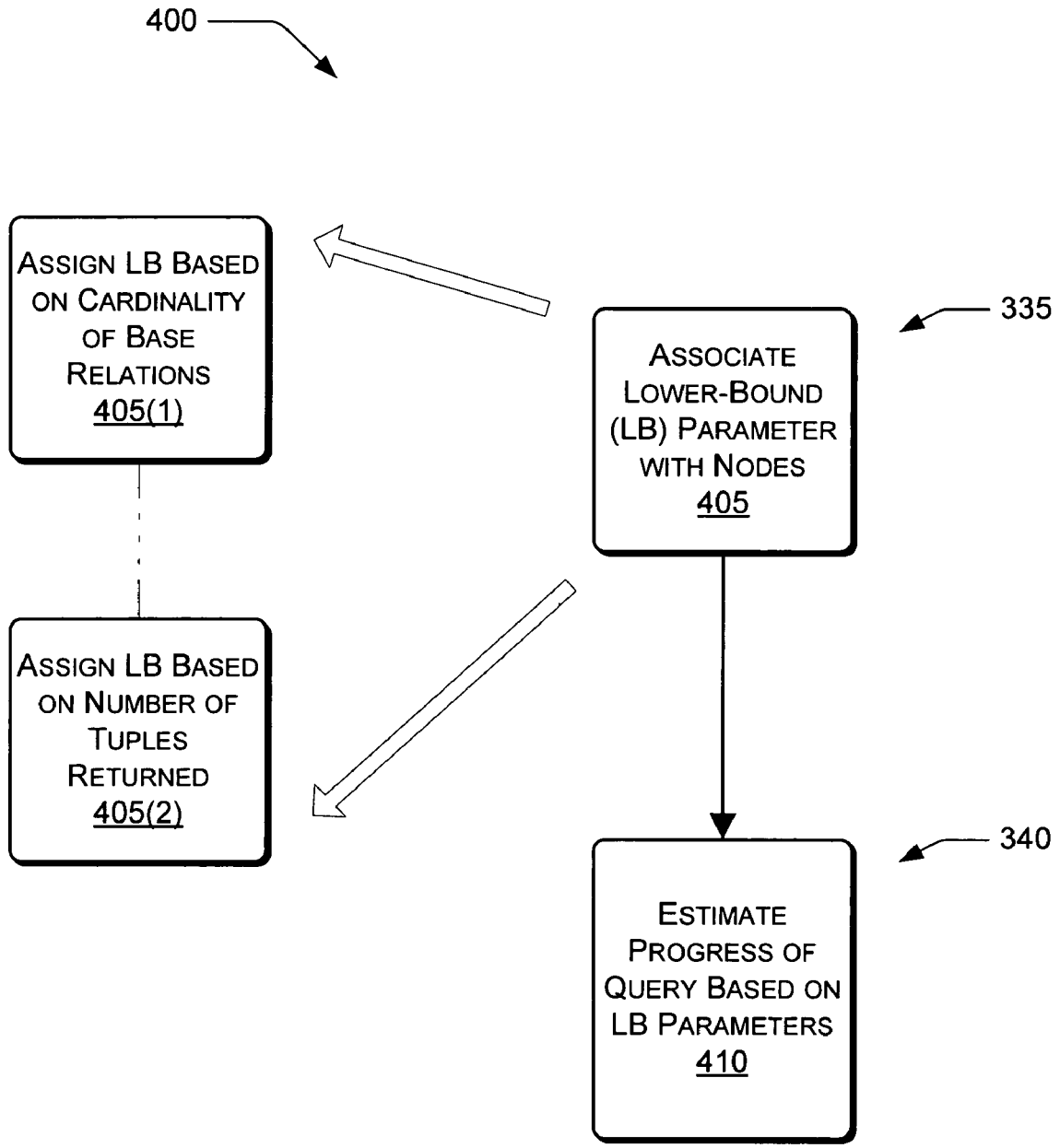
FIG. 4 is a flowchart illustrating aspects of a first technique for estimating progress of the database query shown in FIG. 1.

FIG. 4 illustrates aspects of a process 400 that implements a technique for estimating the progress of the database query 115 shown in FIG. 3. An illustrative implementation of the progress estimator 265 shown in FIG. 2 may execute the process 400. FIG. 4 thus elaborates further on blocks 335 and 340 as shown in FIG. 1. The process 400 represents a technique labeled herein, for convenience of discussion and reference but not limitation, as the "pmax" progress estimation technique for database queries. In block 405, the process 400 estimates the total work to be done in servicing the query 115 by associating a lower-bound (LB) parameter with each node in the operator tree 230, and summing the LB parameters for the nodes in the operator tree 230. Block 405 thus elaborates on block 335 from FIG. 1. The LB parameter for a given node in the operator tree 230 represents a lower bound on an expected number of operations expected to be performed when processing that node during the database query 115. An example operation that might be performed in connection with processing the given node is the getnext function described above.

FIG. 4 illustrates two approaches used by the process 400 to define the LB parameter for a given node. In block 405(1), the process 400 can assign an LB parameter to the node based on the cardinality of the base relations of that node. Referring back to the illustrative operator tree 230 shown in FIG. 2, the LB parameters associated with nodes 235(1) and/or 235(2) can be determined based on the cardinalities of the tables A and B shown as leaves to those nodes 235(1) and/or 235(2).

In block 405(2), the process 400 can assign the LB parameter to each node based upon the number of tuples returned so far in the execution of the query 115. A tuples is a data object containing two or more components. As an example of assigning LB parameters, referring back once again to the operator tree 230 shown in FIG. 2, assume that the request 255 for a progress estimate is received when the query execution engine 225 is processing node 240 in the operator tree 230. In this scenario, the process 400 might determine how many total tuples have been returned so far, assume that each node in the operator tree 230 will involve processing at least that many tuples, and assign this number as an LB parameter to each node in the operator tree 230. Also, the LB parameter for each node can be projected using suitable database statistics.

In block 410, having determined the LB parameter for each node in the operator tree 230 using any of the foregoing approaches, the process 400 estimates the progress of the query 115 based on the LB parameters of each node. Block 410 thus elaborates on the processing shown by block 440 of FIG. 3. In the context of the "pmax" estimator 400 (referred to for convenience as a synonym for the process 400) shown in FIG. 4, the amount of work to be done in servicing each node of the operator tree 230 is assumed to be the least amount of work that could possibly be done for that node. In cases where the actual amount of work done at each node is close to this lower bound parameter, the "pmax" technique 400 may be appropriate for estimating the progress of the query 115.

For a more detailed example of the "pmax" technique 400, consider the following single-join query 115, labeled herein for convenience as Example 1:

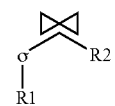

In Example 1, the selection σ is R1.A=x or y, and the join condition is R1.A=R2.B. Assume that the join algorithm used is index-nested-loops-join, and that an appropriate index on relation R2 exists. In addition, assume that in Example 1, |R2|=10|R1|.

At any given point in the query execution, let Curr be the current number of, for example, getnext calls that have occurred across all operators in the operator tree 230 up to that given point. Let LB be the sum of the lower bounds for the total number of getnext calls expected across all nodes in the operator tree 230 (block 405 in FIG. 4). Thus, the pmax estimator 400 shown in FIG. 4 assumes that only the least amount of work will be done in executing the rest of the query 115. At the given point in the query execution, the pmax estimator 400 returns Curr/LB as the estimate of the progress of the query 115 up to that point (block 410 in FIG. 4).

The features of the pmax estimator 400 are further illustrated by modifying Example 1 slightly. For convenience, the modified Example 1 scenario is labeled here as Example 2. Suppose that, in Example 2, both R1 and R2 each contain 100,000 tuples. Assume that the only tuples to pass through the selection in R1 joins with 10,000 tuples in R2, and that the other tuples in R1 fail the selection. Note that for this query, the total number of getnext calls=100,000+10,000+1=110,001. The pmax estimator 400 exhibits maximum error when its estimate of the total number of, for example, getnext calls is furthest from the number of getnext calls that actually occur. The LB used by the pmax estimator 400 is at least 100,000, since the outer relation is scanned once to evaluate this query. Thus, the ratio error for the pmax estimator 400 is at most 1.1, irrespective of the ordering of relation R1.

To put this error level in perspective, we first contrast Example 2 with Example 1. Recall that in Example 1, the cardinality of R2 was stated to be ten times that of R1. As a result, if there is a given tuples in R1 that joins with a large number of tuples in R2, this given tuples will dominate the cost of the query, since there are not enough other tuples in R1 to "compensate" for or "offset" the impact of this particular tuples. On the other hand, in Example 2, R1 contains enough tuples to be processed, so that even if a given tuples causes the join to be skewed, the pmax estimator 400 is still able to estimate the progress effectively. As stated above, the pmax estimator 400 assumes that, for each node in the operator tree, a minimum amount of work will be performed when processing that node. Thus, in the course of processing some portion of the tuples of R1, the pmax estimator 400 is not heavily impacted by any one tuples exhibiting a high cost.

A given progress estimator, labeled herein for convenience as a dne estimator, may operate based on the general assumption that the present is an accurate predictor or indicator of the future. Thus, the dne estimator may maintain a current average of getnext calls performed per-tuple, and assume that processing the next tuple will produce the number of getnext calls indicated by the current average. However, if a dne estimator were used in the above examples, it could yield high errors for certain orderings of relation R1. For instance, if the tuple that satisfies the predicate happens to be the first tuple of R1, the correct value of progress after the first tuple is processed would be 10,000/110,001. However, the dne estimator would calculate the progress as 1/100,000, which would result in a relatively large error ratio as compared to the pmax estimator 400.

Herein, $\mu$ is the average number of, for example, getnext calls performed per "input" tuple during the execution of a given query 115. More particularly, $\mu$ is the average number of getnext calls performed per tuple of RI. In the data set of Example 1, the variance in the per-tuple work $\mu$ is high, since there is one tuple that joins with 10,000 tuples of R2, but no other tuple even passes through the selection.

Generally speaking, the pmax estimator 400 can be particularly effective as a progress estimator when $\mu$ is small. Observe that the above general statement depends only on $\mu$, and holds irrespective of any variance in the per-tuple costs. In cases where $\mu$ is small and the variance in per-tuple costs is high, the pmax estimator 400 can represent an improvement over an estimator such as the dne estimator.

Figure 5:
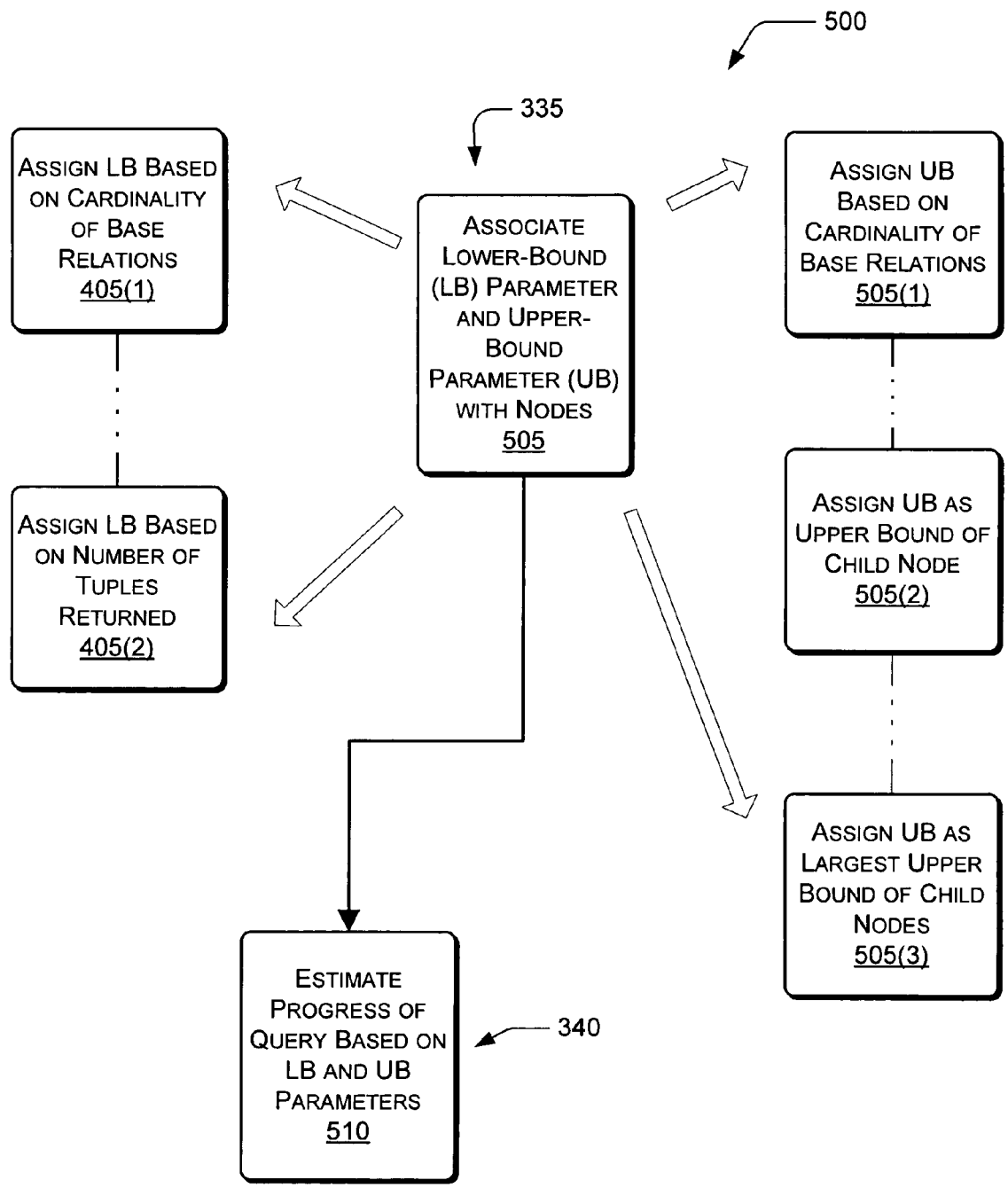
FIG. 5 is a flowchart illustrating aspects of a second technique for estimating progress of the database query shown in FIG. 1.

FIG. 5 illustrates a process 500 implementing a second technique for estimating progress of the database query shown in FIG. 3. Another illustrative implementation of the progress estimator 265 shown in FIG. 2 may execute the process 500. The process 500 elaborates on blocks 335 and 340 as shown in FIG. 3. The process 500 includes a technique labeled herein, for ease of discussion and reference but not limitation, as the "safe" estimator 500 for estimating progress of database queries 115.

In block 505, the process 500 associates both a lower-bound (LB) parameter and an upper-bound (UB) parameter with each node in the operator tree 230. The processing shown in block 505 thus elaborates particularly on block 335 in FIG. 3, and provides further details on how to determine the total amount of work to be done in servicing the entire query 115. The LB parameter as shown in FIG. 5 can be defined similarly to the LB parameter shown in FIG. 4. Thus, the blocks 405(1) and 405(2) are included in FIG. 3 for convenience.

While the sums of the LB parameters represent a lower bound for the processing performed the nodes in the operator tree 230, the sums of the UB parameters for the nodes in the operator tree 230 represent an upper bound of this processing. FIG. 5 illustrates several approaches to determining this UB parameter. In block 505(1), the process 500 assigns the UB parameter for a given node based on the cardinality of the base relations for that given node in that operator tree 230. Recall that in block 405(1), the processes 400 and 500 can assign the LB parameter for a given node based on the lower bound of the cardinality of the base relations for that node. Similarly, the process 500 in block 505(1) can assign the UB parameter for a given node based on the upper bound of the cardinality of the base relations for that node.

Continuing with alternatives for defining the UB parameter for a given node, in block 505(2), the process 500 can assign the UB parameter of a given node as the upper bound of the processing performed for a child of that given node. In block 505(3), the process 500 can assign the UB parameter of a given node as the largest upper bound of processing performed for any child of that given node. For example, a table scan may have lower and upper bounds equal to the cardinality of the base relation, and these bounds may be available from database catalogs. As execution of the query 115 proceeds, these bounds can be refined based on the execution trace or other characteristics observed during the query. Also, as with the LB parameter discussed above, the UB parameter for each node can be projected using suitable database statistics.

Having defined and associated LB and UB parameters with the various nodes of the operator tree 230, the process 500 proceeds to block 510, where the process 500 estimates the progress of the query 115 based on both the LB and UB parameters. As discussed above, in general the teachings herein estimate progress of the database query 115 by dividing the work done so far in the query 115 by the total work that the entire query 115 is estimated to entail. The pmax estimator 400 shown in FIG. 4 estimates the total work entailed by the entire query 115 using the LB parameters associated with each node, and assumes that each node in the operator tree 230 will entail only a minimal amount of work. However, the safe estimator 500 shown in FIG. 5 uses not only the LB parameter but also the UB parameter, and assumes that each node in the operator tree 230 will entail an amount of work falling somewhere between the established lower and upper bounds.

Revisiting Examples 1 and 2 discussed above, a key issue that a progress estimator 265 can face when it is about to retrieve the next tuple from R1 is whether this tuple will cause relatively many getnext calls, relatively few getnext calls, or a number of getnext calls falling somewhere in between. The dne estimator, discussed above, assumes that the present is an accurate indicator of the future, and so assumes that this next tuple is going to produce as many getnext calls as the current per-tuple average of getnext calls. The pmax estimator 400 shown in FIG. 4 assumes that this next tuple will produce a minimal number of getnext calls. The safe estimator 500 shown in FIG. 5 bases its progress estimate on both upper-bound and lower-bound parameters for the various nodes in the operator tree 230, and thus is prepared for the possibility that the future can be completely different from the execution trace seen so far in the query 115. In this sense, the safe estimator 500 can offer more accurate progress estimations when this next tuple produces a relatively large number of getnext calls.

Turning to the operation of the safe estimator 500 in more detail, at any point in the query execution, let Curr be the current number of, for example, getnext calls that have been executed across all operators in the operator tree 230 up to that given point. Let LB be the sum of the lower bounds for the total number of getnext calls across all nodes in the operator tree 230, and let UB be the corresponding sum of the upper bounds. At the given point during query execution, block 510 can return a progress estimate 280 computed as follows:

$$\frac{Curr}{\sqrt{LB \times UB}}$$

Observe that the ratio error yielded by the safe estimator 500 is at most $\sqrt{UB/LB}$. As discussed above, the dne estimator assumes that the amount of work to process all future tuples can be estimated accurately based on the average amount of work to process past tuples. However, the presence or absence of a single tuple can determine whether the sum of all the operator cardinalities approaches the lower bound or the upper bound. Moreover, it can be difficult in practice to detect the presence or absence of such a single tuple from database statistics and execution feedback. This condition can undermine the effectiveness of the dne estimator. However, the "safe" estimator 500 addresses this condition by assuming that either of the upper or lower bounds is attainable as the query progresses, and taking a "middle" road to minimize the worst-case error.

Figure 6:
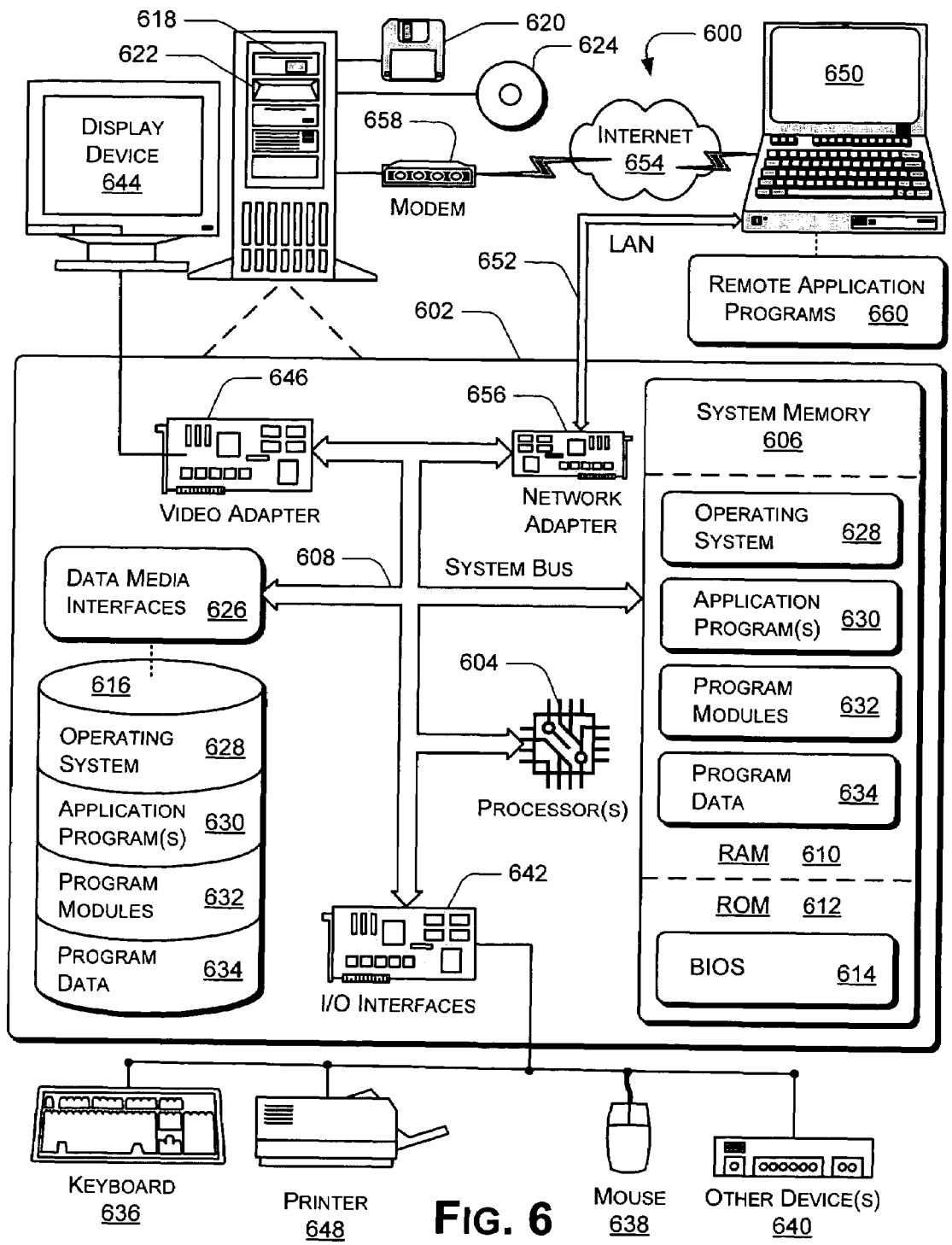
FIG. 6 illustrates a computing environment within which techniques for estimating the progress of database queries, as well as the computing, network, and system architectures described herein, can be either fully or partially implemented.

FIG. 6 illustrates a computing environment 600 for estimating the progress of database queries, and for fully or partially implementing the computing, network, and system architectures described herein. More particularly, the computing environment 600 may be suitable for implementing and/or supporting various components described herein, including but not limited to some or all of the workstations 105 and 260, the database servers 120, and the data stores 125 and 275.

Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Although embodiments for estimating the progress of database queries have been described in language specific to structural features and/or methods, it is to be understood that the subject of the appended claims is not necessarily limited to the specific features or methods described. Rather, the specific features and methods are disclosed as exemplary implementations of efficiently processing of time-bounded messages.

The invention claimed is:

1. One or more computer readable storage media comprising computer executable instructions that, when executed, direct a computing device to:

associate at least a respective lower-bound parameter with each node in an operator tree representing a database query, wherein each lower-bound parameter represents a lower bound on a number of operations expected to be performed when processing the node during the database query;

execute the database query;

estimate progress of the database query at a given point in the database query based at least in part upon the lower-bound parameters by dividing a number of operations performed during the database query up to the given point by a sum of the respective lower-bound parameters associated with each of the nodes of the operator tree; and refine the estimate of the progress of the database query based on characteristics observed during the query.

2. The computer readable storage media of claim 1, wherein the computer executable instructions direct the computing device to associate the respective lower-bound parameter by defining the lower-bound parameter based on a cardinality of at least one base relation associated with the database query.

3. The computer readable storage media of claim 1, wherein the computer executable instructions direct the computing device to associate the respective lower-bound parameter by defining the lower-bound parameter based on a number of tuples returned up to the given point in the database query.

4. The computer readable storage media of claim 1, further comprising computer executable instructions that direct the computing device to refine at least one lower-bound parameter associated with at least one of the nodes as the database query progresses.

5. The computer readable storage media of claim 1, further comprising computer executable instructions that direct the computing device to associate at least a respective upper-bound parameter with at least one node in the operator tree.

6. The computer readable storage media of claim 5, further comprising computer executable instructions that direct the computing device to estimate progress of the database query based at least in part on the upper-bound parameter and the lower-bound parameter.

7. One or more computer readable storage media comprising computer executable instructions that, when executed, direct a computing device to:

associate a respective lower-bound parameter and a respective upper-bound parameter with each node in an operator tree representing a database query, wherein each lower-bound parameter represents a lower bound on a number of operations expected to be performed when processing the node during the database query and each upper-bound parameter represents an upper bound on a number of operations expected to be performed when processing the node during the database query;

execute the database query;

estimate progress of the database query at a given point in the database query based on the lower-bound parameter and the upper-bound parameter by dividing a number of operations performed during the database query up to the given point by a parameter determined by summing the average of the lower-bound parameter and the upper-bound parameter of each node in the operator tree; and refine the estimate of the progress of the database query based on characteristics observed during the query.

8. The computer readable storage media of claim 7, wherein the computer executable instructions direct the computing device to associate the respective lower-bound parameter by defining the lower-bound parameter based on a cardinality of at least one base relation associated with the database query.

9. The computer readable storage media of claim 7, wherein the computer executable instructions direct the computing device to associate the respective lower-bound parameter by defining the lower-bound parameter based on a number of tuples returned up to the given point in the database query.

10. The computer readable storage media of claim 7, wherein the computer executable instructions direct the computing device to associate a respective upper-bound parameter with each node by defining the upper-bound parameter based on a cardinality of at least one base relation associated with the database query.

11. The computer readable storage media of claim 7, wherein the computer executable instructions direct the computing device to associate a respective upper-bound parameter with each node by assigning to a given operator node an upper-bound parameter of a child node of the given operator node.

12. The computer readable storage media of claim 7, wherein the computer executable instructions direct the computing device to associate a respective upper-bound parameter with each node by assigning to a given node a largest upper-bound parameter associated with one of a plurality of child nodes of the given node.

13. The computer readable storage media of claim 7, wherein the computer executable instructions direct the computing device to estimate progress of the database query by dividing a number of operations performed during the database query up to the given point by the square root of the sum of the respective lower-bound parameters multiplied by the sum of the respective upper-bound parameters.

14. A computer implemented method comprising:
associating at least a respective lower-bound parameter with each node in an operator tree representing a database query, wherein each lower-bound parameter represents a lower bound on a number of operations expected to be performed when processing the node during the database query;
executing the database query; estimating progress of the database query at a given point in the database query based exclusively on the lower-bound parameters by dividing a number of operations performed during the database query up to the given point by a sum of the respective lower-bound parameters associated with the nodes of the operator tree and
refining the estimate of the progress of the database query based on characteristics observed during the query.

* * * * *